(12) United States Patent
Mora (10) Patent No.: US 8,984,798 B2
(45) Date of Patent: Mar. 24, 2015

(54) FISHING AID

(71) Applicant: Roger M. Mora, Las Vegas, NV (US)

(72) Inventor: Roger M. Mora, Las Vegas, NV (US)

(*) Notice: Subject to any disclaimer, the term of this patent is extended or adjusted under 35 U.S.C. 154(b) by 110 days.

(21) Appl. No.: 13/682,571

(22) Filed: Nov. 20, 2012

(65) Prior Publication Data
US 2014/0137459 A1    May 22, 2014

(51) Int. Cl.
*A01K 97/12* (2006.01)
*A01K 97/10* (2006.01)

(52) U.S. Cl.
CPC .............. *A01K 97/125* (2013.01); *A01K 97/10* (2013.01)
USPC ................................................. 43/17; 43/21.2

(58) Field of Classification Search
USPC ............. 43/17, 21.2; 248/530, 532, 533, 511, 248/311.2, 146, 153, 156
IPC ........................................... A01K 97/12,97/10
See application file for complete search history.

(56) References Cited

U.S. PATENT DOCUMENTS

| | | | | |
|---|---|---|---|---|
| 2,804,819 A * | 9/1957 | Whealton | ........................ | 99/441 |
| 3,033,502 A * | 5/1962 | Silver | ............................. | 248/538 |
| 4,004,365 A * | 1/1977 | Manchester | ....................... | 43/17 |
| 4,154,015 A * | 5/1979 | Holland | ............................. | 43/17 |
| 4,506,468 A * | 3/1985 | Willhite | ............................. | 43/17 |
| 6,646,557 B2 * | 11/2003 | Brake | ........................ | 340/573.2 |
| 8,695,268 B2 * | 4/2014 | Gouthro et al. | .................... | 43/17 |
| 2005/0246939 A1 * | 11/2005 | Keck | ................................. | 43/17 |

* cited by examiner

*Primary Examiner* — Darren W Ark
*Assistant Examiner* — Kathleen Alker
(74) *Attorney, Agent, or Firm* — Weide & Miller, Ltd.

(57) ABSTRACT

A portable fishing aid that contains two detachable parts, the outer sleeve and the sleeve holder, wherein the outer sleeve contains a built-in audiovisual bite and alert sensor and the outer sleeve holder contains a wire basket or similar material permanently attached to a penetration spike that can be safely driven into the ground at a preferable angle and depth to withstand and support the weight of the fishing pole.

4 Claims, 15 Drawing Sheets

FIG.18

FISHING AID

BACKGROUND

The basic idea of this invention resulted from a study of military veterans all around the world who courageously served their country and fought for freedom but who are now handicapped and would like to rest while fishing. Suitably aside from being a source of livelihood, fishing is a recreational activity that can be done by everyone, the whole family, business partners and friends, with the simple concept of this fishing aid, it enables people to make use of time wisely, efficiently and enjoyably by fishing while resting and playing, and not created to take away the natural fishing experience but to enhance and to make it stress free and more enjoyable.

SUMMARY

This fishing aid, is a fishing pole holder sleeve with audio and visual alarm especially designed for people with physical disabilities who have limited mobility and people who are deaf and blind but have an interest in fishing. Accordingly, this fishing aid is for everyone, hobbyist and professional alike, who are into fishing. This device may be unreliable when using large live baits and when the fishing area has excessive wind.

DETAILED DESCRIPTION OF THE DRAWINGS

Figure 1:
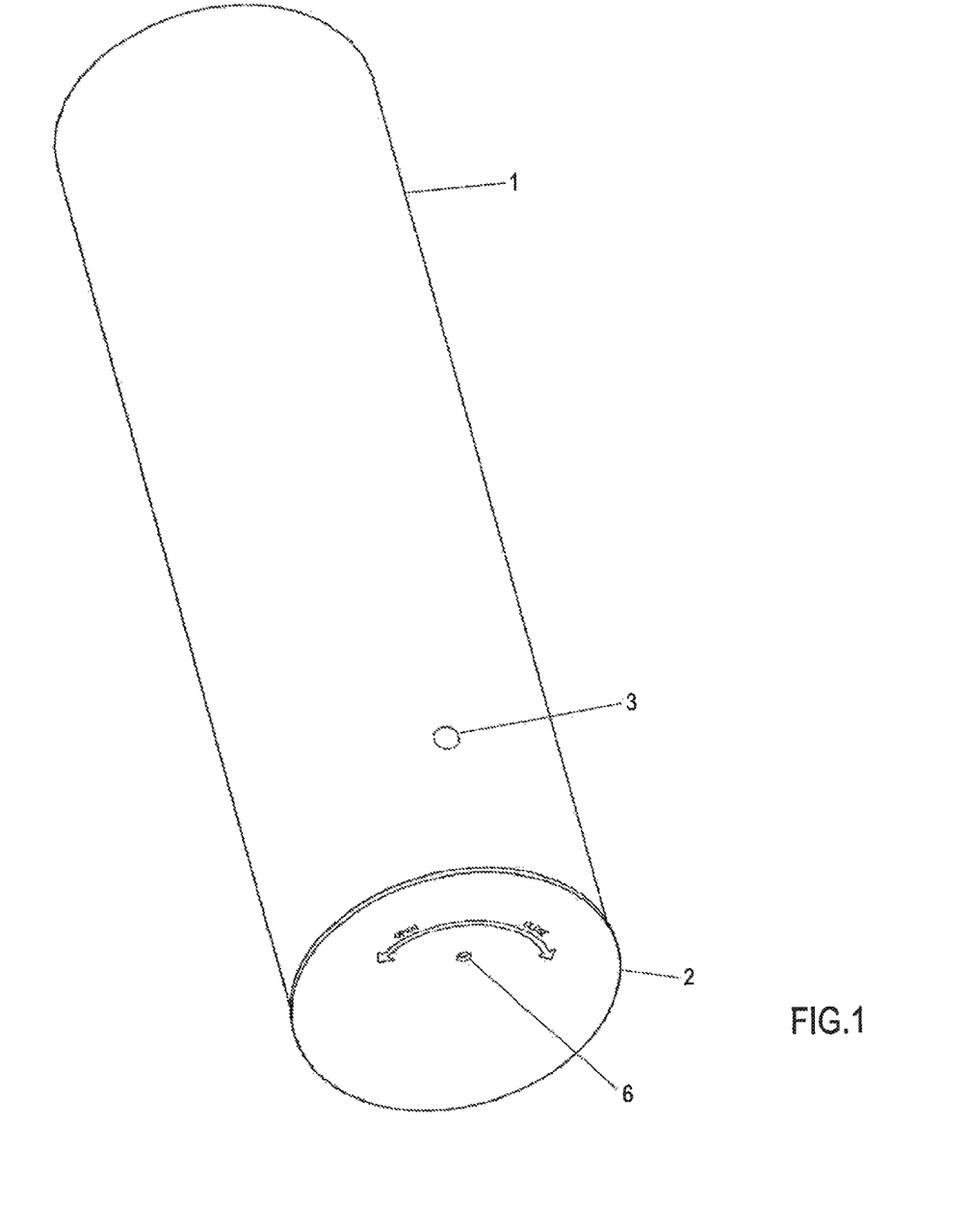
FIG. 1 is a front view of the outer sleeve.

The figures are now described with like reference numbers referring to like parts throughout. FIG. 1 is a perspective view taken from the front side of the outer sleeve constructed in accordance with the invention. No. 1 is the outer sleeve, no. 2 is the bottom cover, no. 3 is the light, no. 6 is the audio port hole.

Figure 2:
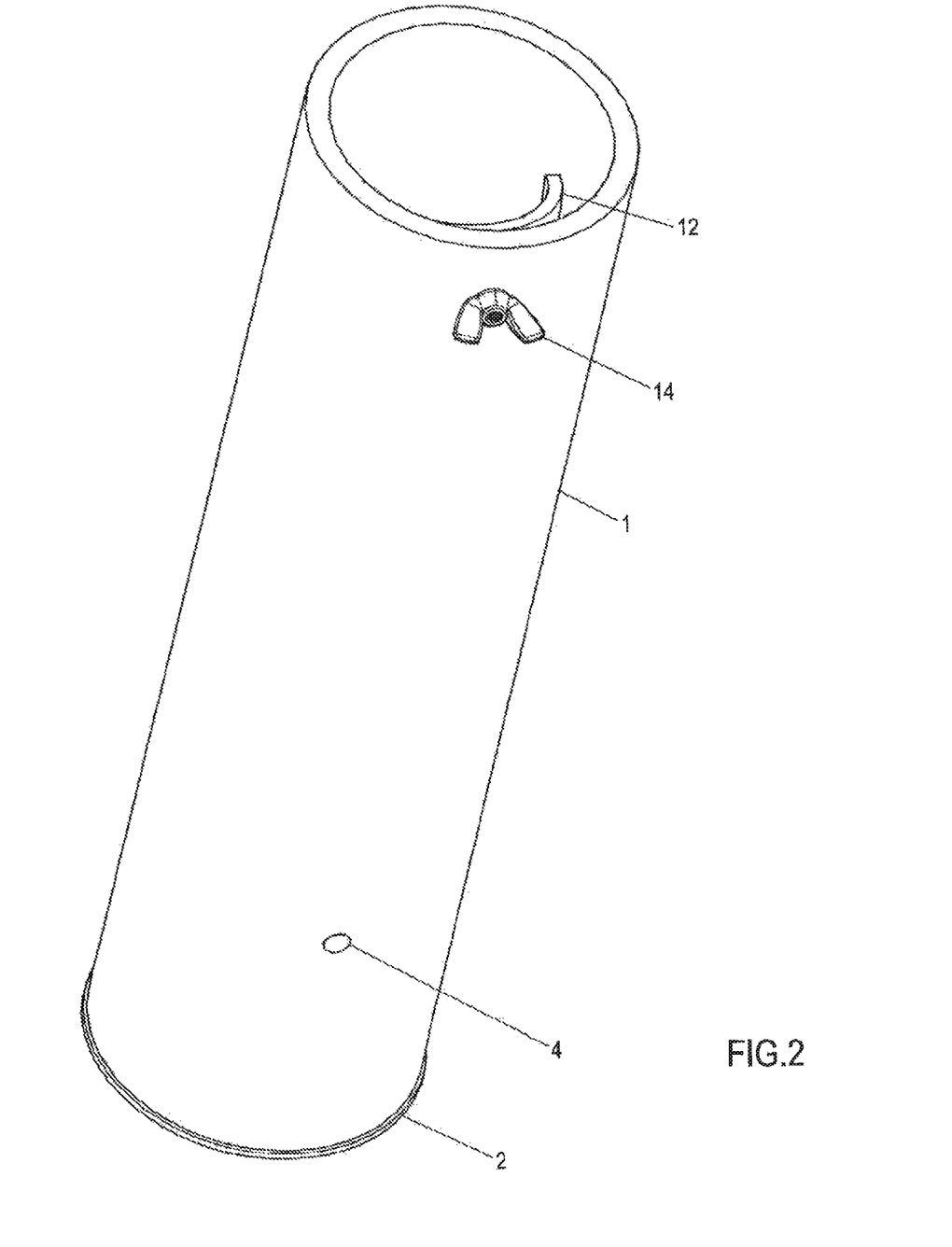
FIG. 2 is a back view of the outer sleeve.

FIG. 2 is a perspective back view of the outer sleeve. No. 1 is the outer sleeve, no. 2 is the bottom cover, no. 4 is the moisture drip hole, no. 12 is the pole stabilizer, no. 14 is the adjustable bite sensor.

Figure 3:
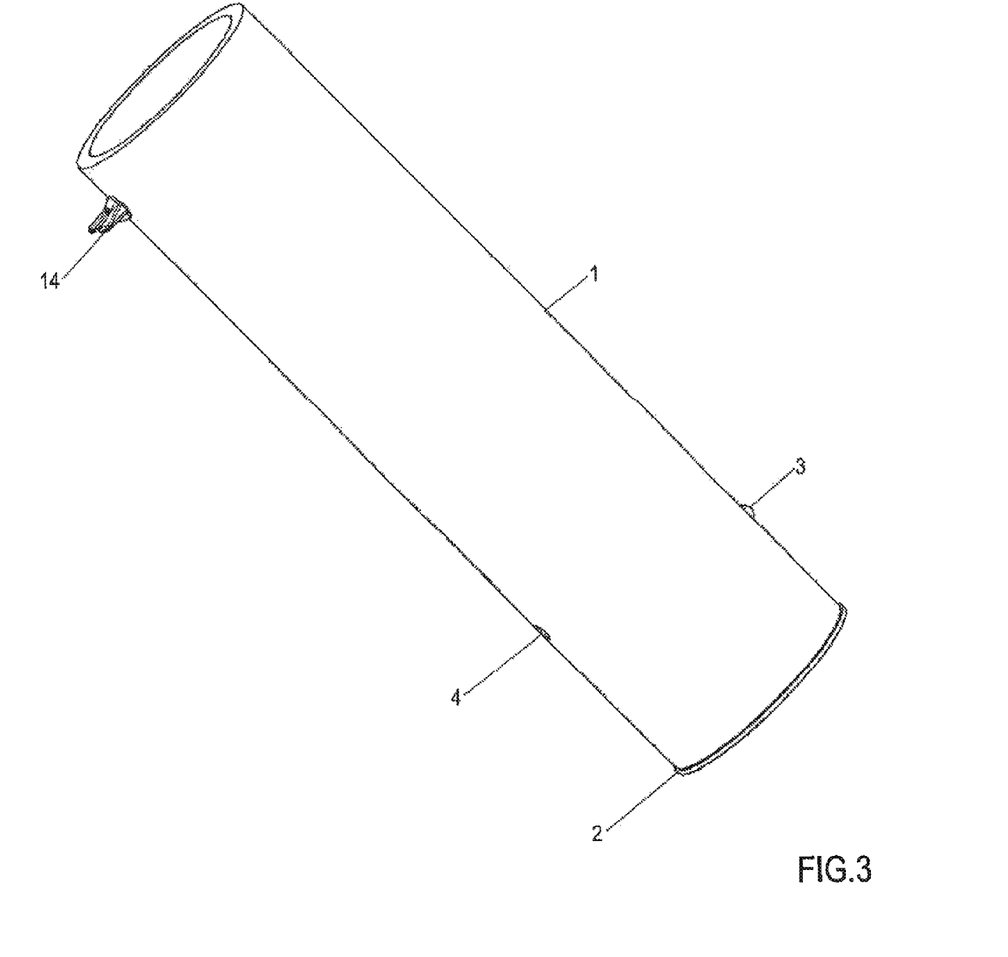
FIG. 3 is a left side view of the outer sleeve.

FIG. 3 is the perspective back view of the outer sleeve. No. 1 is the outer sleeve, no. 2 is the bottom cover, no. 3 is the light, no. 4 is the moisture drip hole, no. 14 is the adjustable bite sensor.

Figure 4:
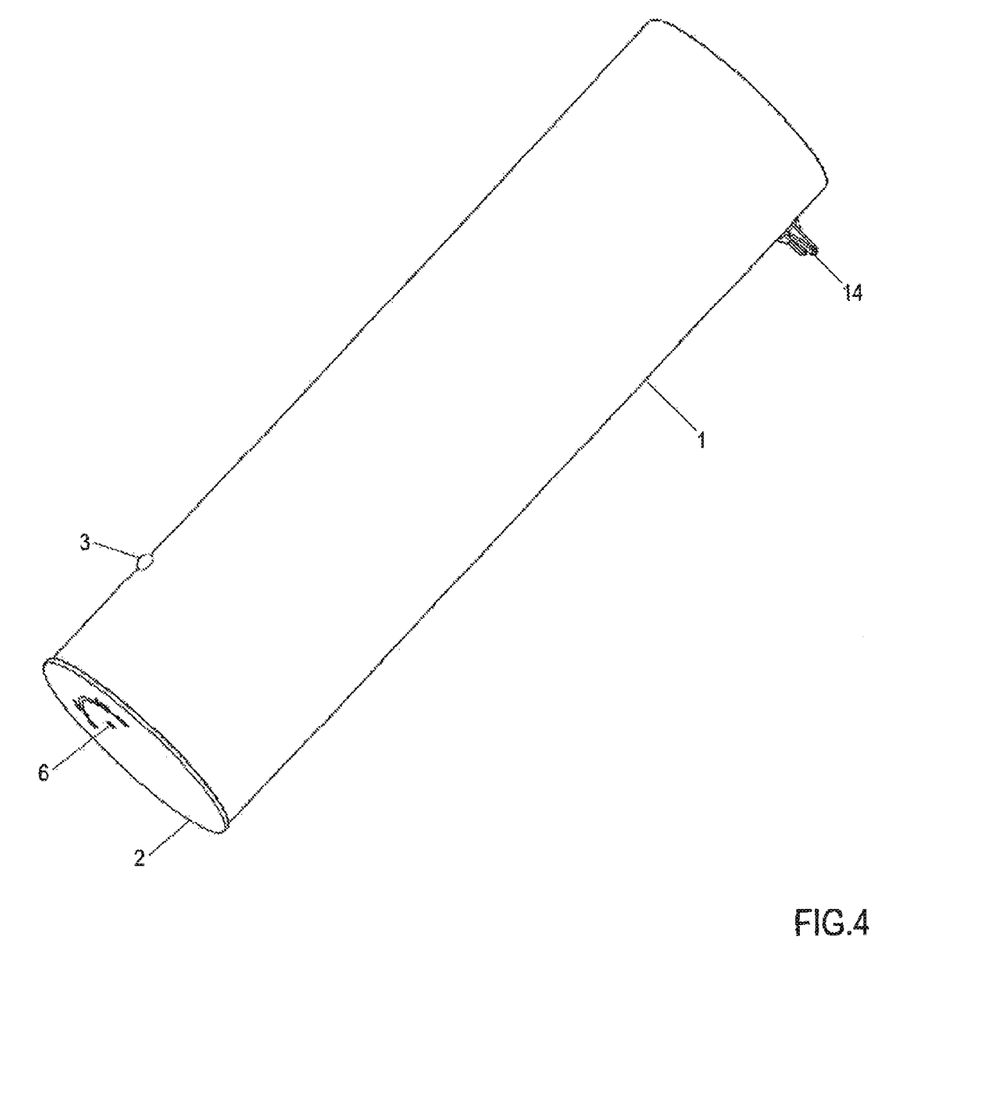
FIG. 4 is a right side view of the outer sleeve.

FIG. 4 is the perspective right side view of the outer sleeve. No. 1 is the outer sleeve, no. 2 is the bottom cover, no. 3 is the light, no. 6 is the audio port hole, no. 14 is the bite adjustment sensor.

Figure 5:
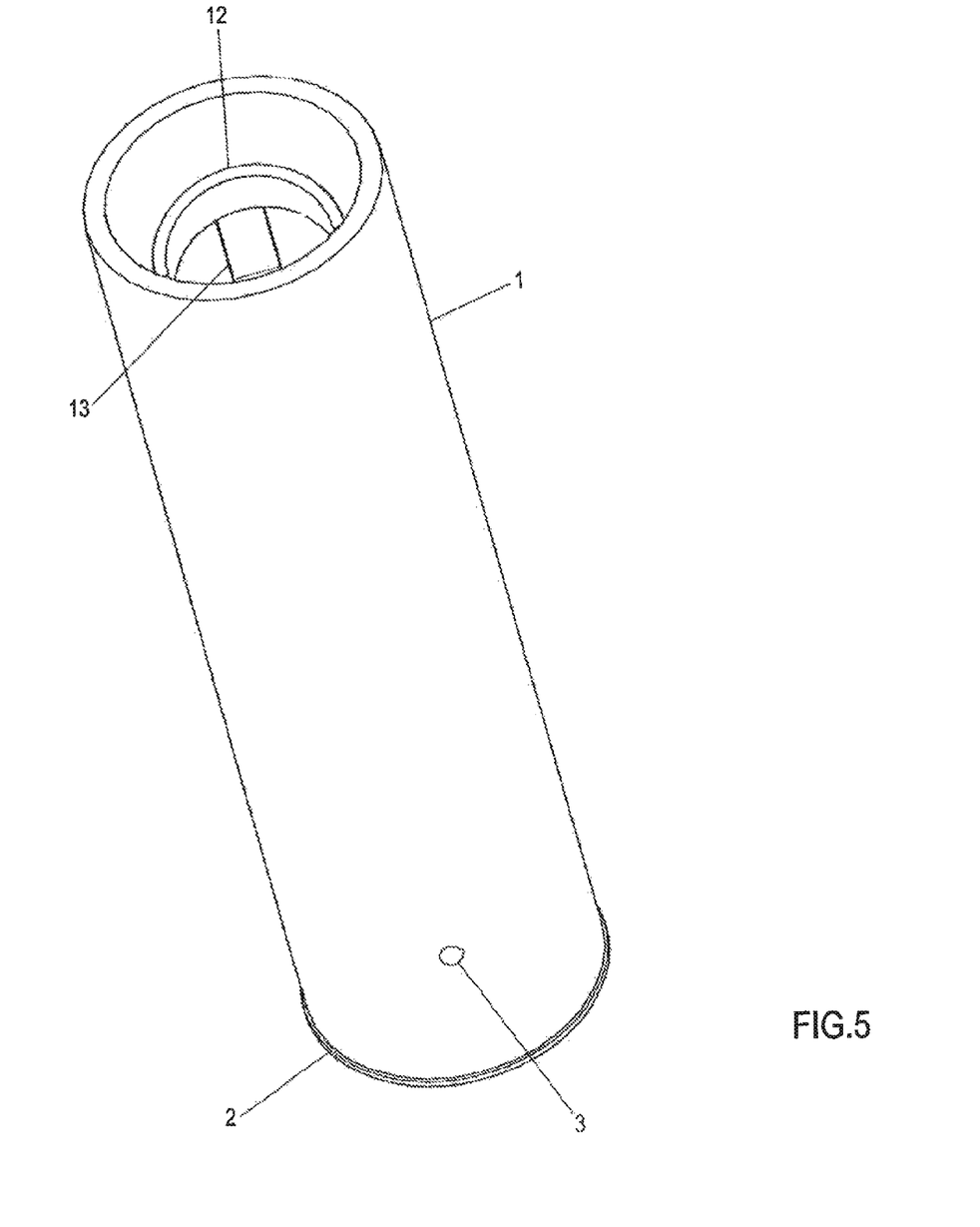
FIG. 5 is a top view of the outer sleeve.

FIG. 5 is the perspective top view of the outer sleeve. No. 1 is the outer sleeve, no. 2 is the bottom cover, no. 3 is the light, no. 12 is the pole stabilizer, no. 13 is the spring actuating bracket.

Figure 6:
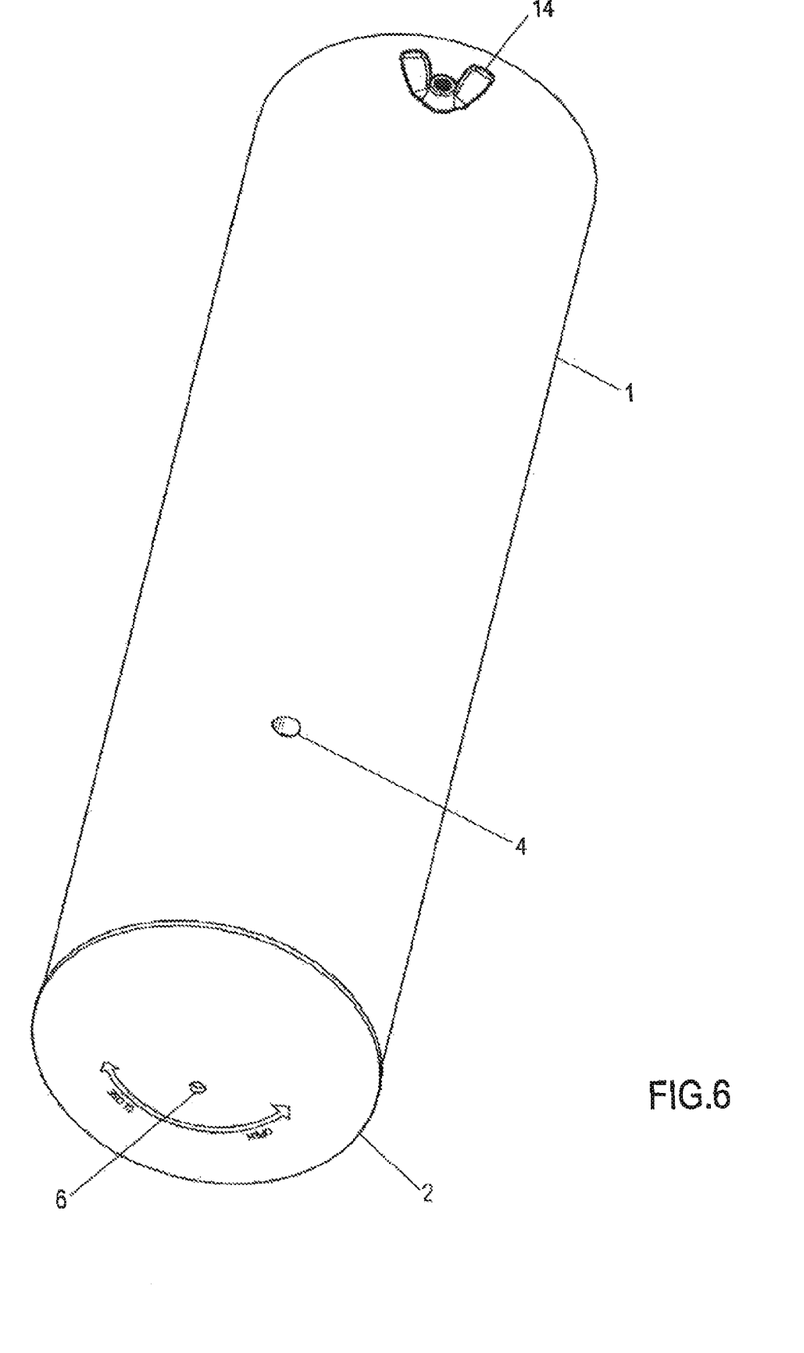
FIG. 6 is a bottom view of the outer sleeve.

FIG. 6 is the perspective bottom view of the outer sleeve. No. 1 is the outer sleeve, no. 2 is the bottom cover, no. 4 is the outer sleeve moisture drip hole, no. 6 is the audio port hole, no. 14 is the adjustable bite sensor.

Figure 7:
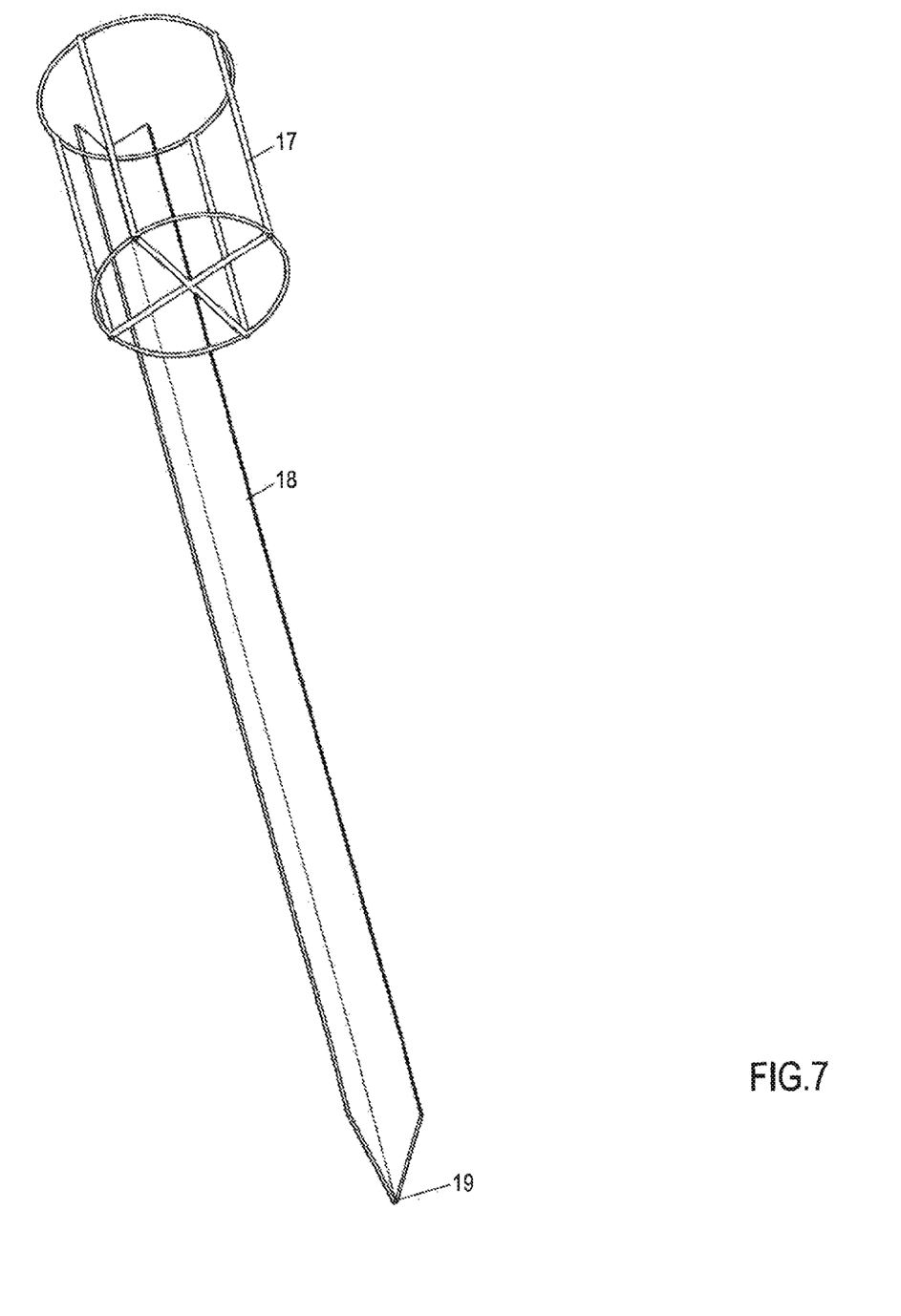
FIG. 7 is a front view of the sleeve holder.
Figure 8:
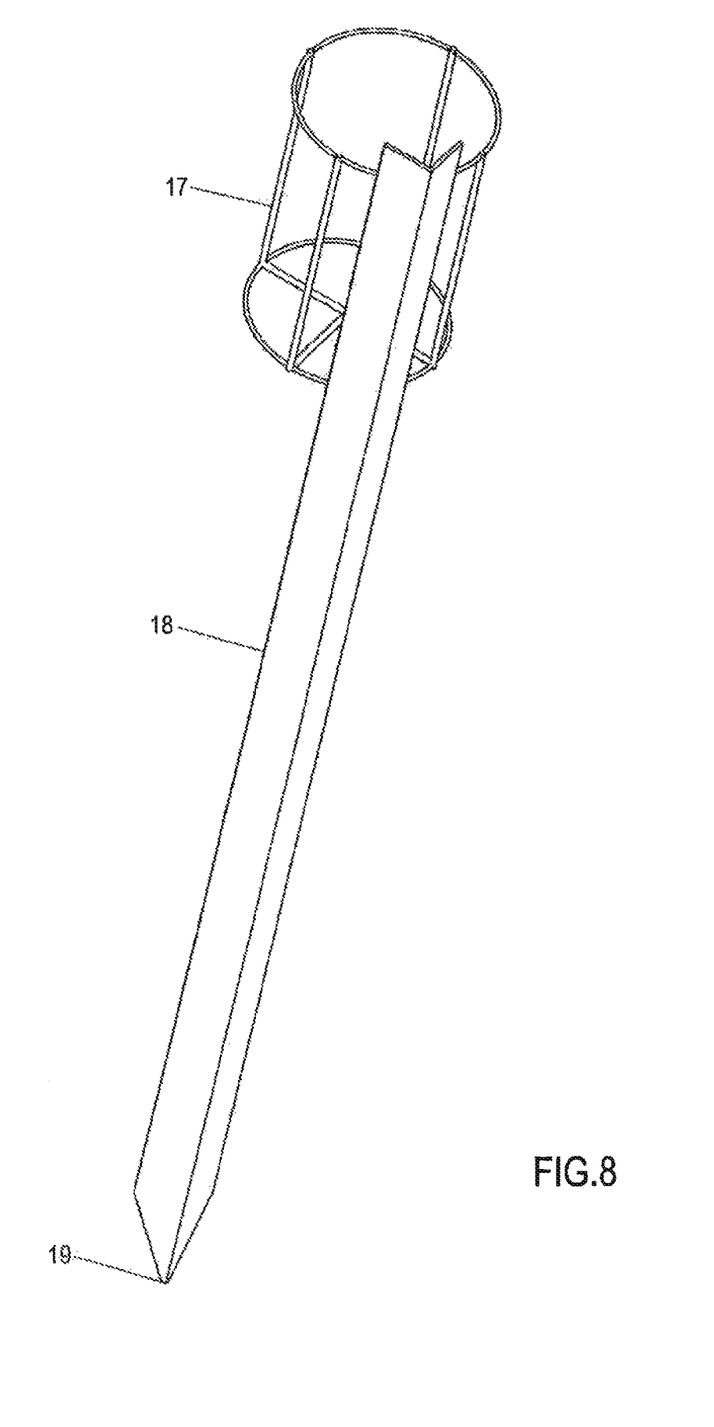
FIG. 8 is a back view of the sleeve holder.

FIG. 7 is the perspective front view of the sleeve holder. No. 17 is the basket, no. 18 is the sleeve holder, no. 19 is the spike, FIG. 8 is the perspective back view of the sleeve holder. No. 17 is the basket, no. 18 is the sleeve holder, no. 19 is the spike.

Figure 9:
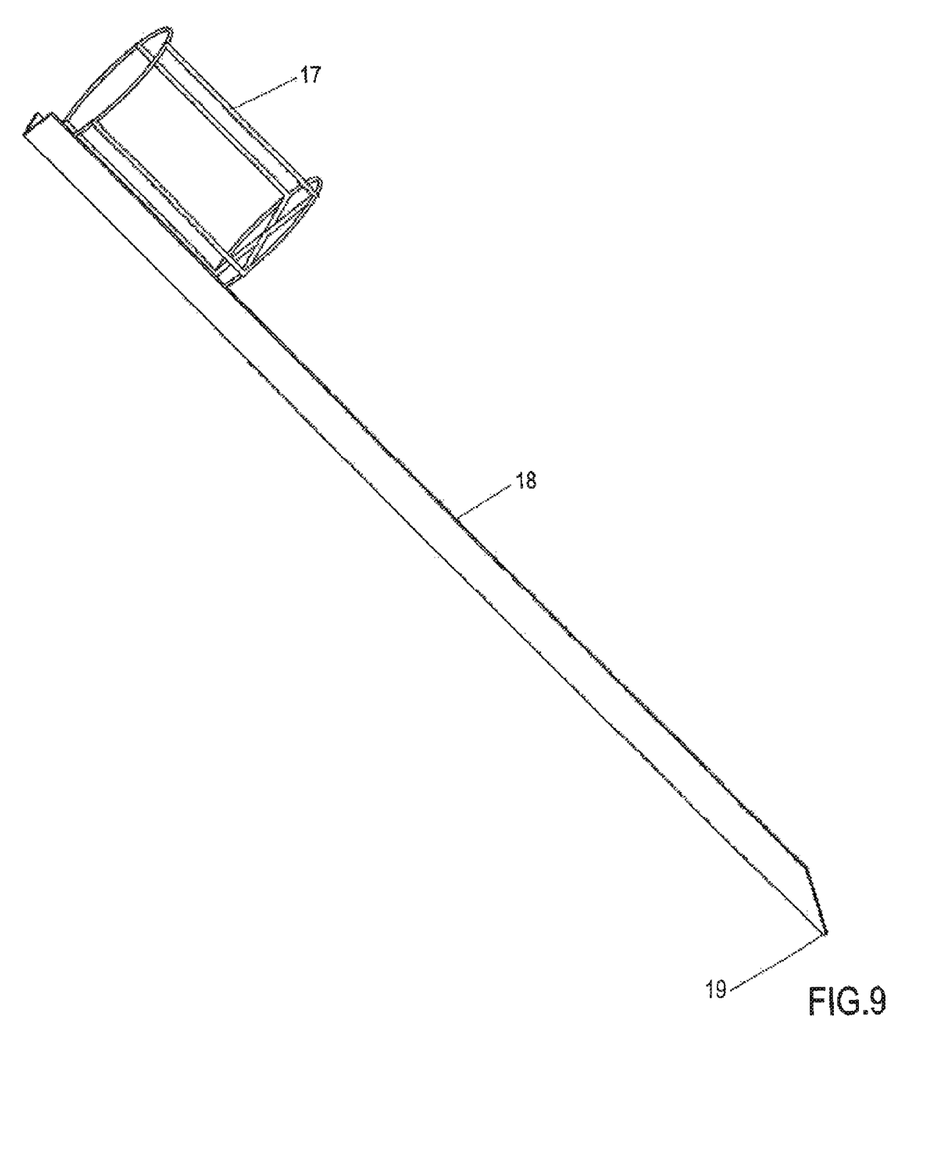
FIG. 9 is a left view of the sleeve holder.

FIG. 9 is the perspective left view of the sleeve holder. No. 17 is the basket, no. 18 is the sleeve holder, no. 19 is the spike.

Figure 10:
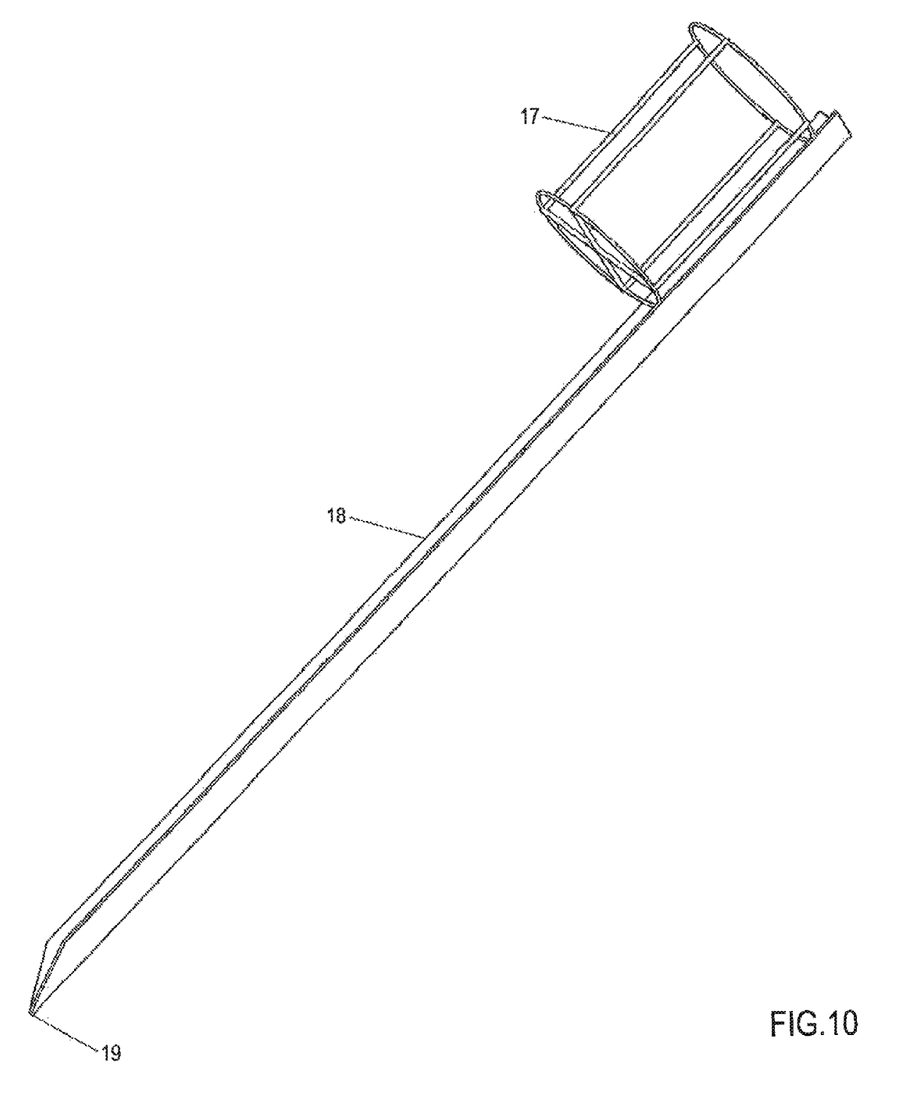
FIG. 10 is a right view of the sleeve holder.

FIG. 10 is the perspective right view of the sleeve holder. No. 17 is the basket, no. 18 is the sleeve holder, no. 19 is the spike.

Figure 11:
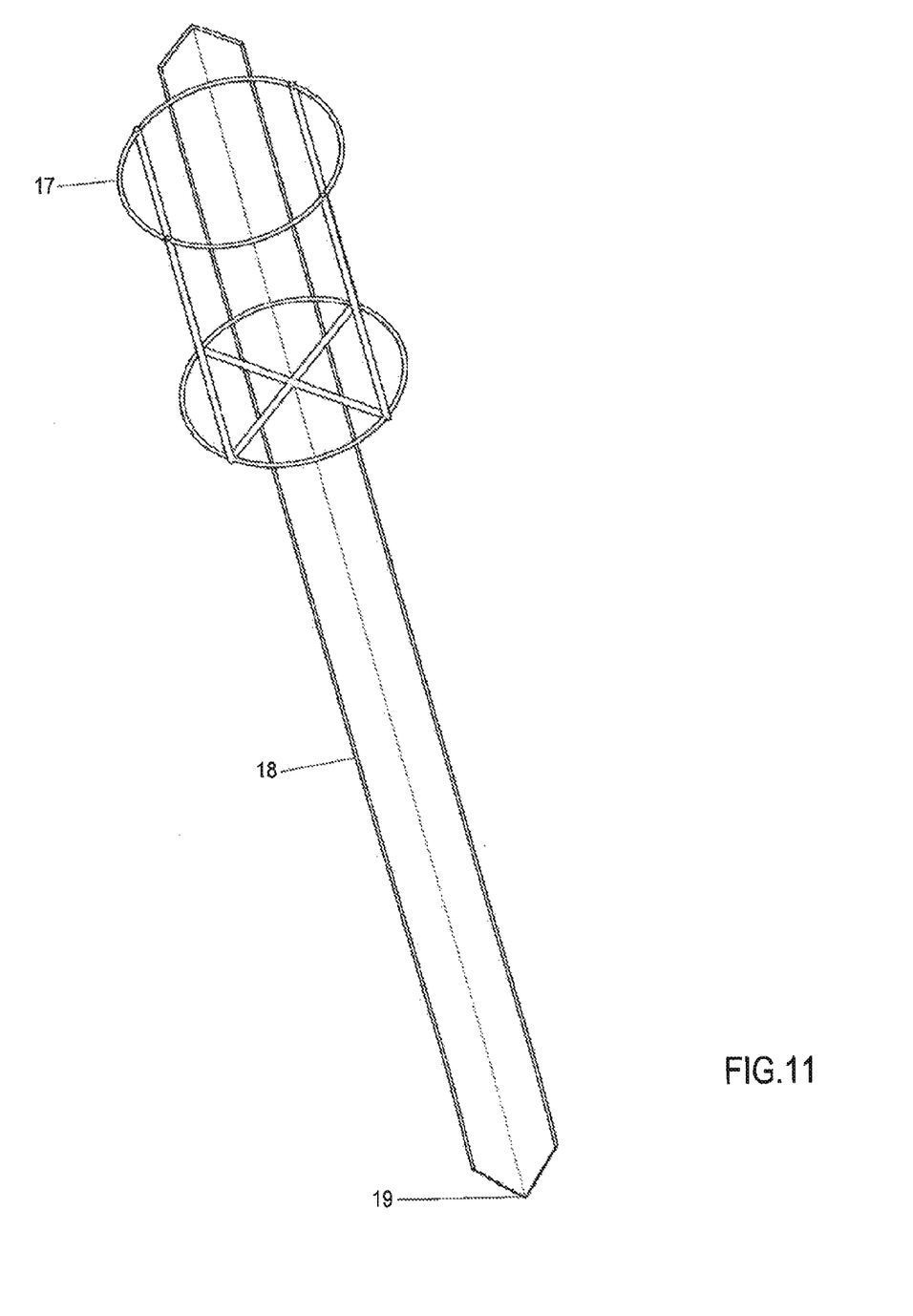
FIG. 11 is a top view of the sleeve holder.

FIG. 11 is the perspective top view of the sleeve holder. No. 17 is the basket, no. 18 is the sleeve holder, no. 19 is the spike.

Figure 12:
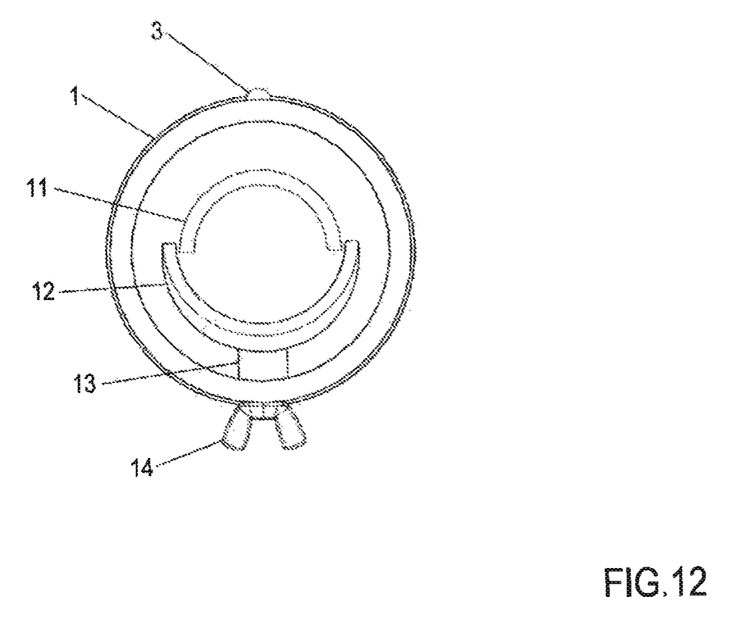
FIG. 12 is a top view of the outer sleeve.

FIG. 12 is the perspective top view of the outer sleeve. No. 1 is the outer sleeve, no. 3 is the light, no. 11 is the shaft holder, no. 12 is the pole stabilizer, no. 13 is the spring actuating bracket, no. 14 is the adjustable bite sensor.

Figures 13, 14:
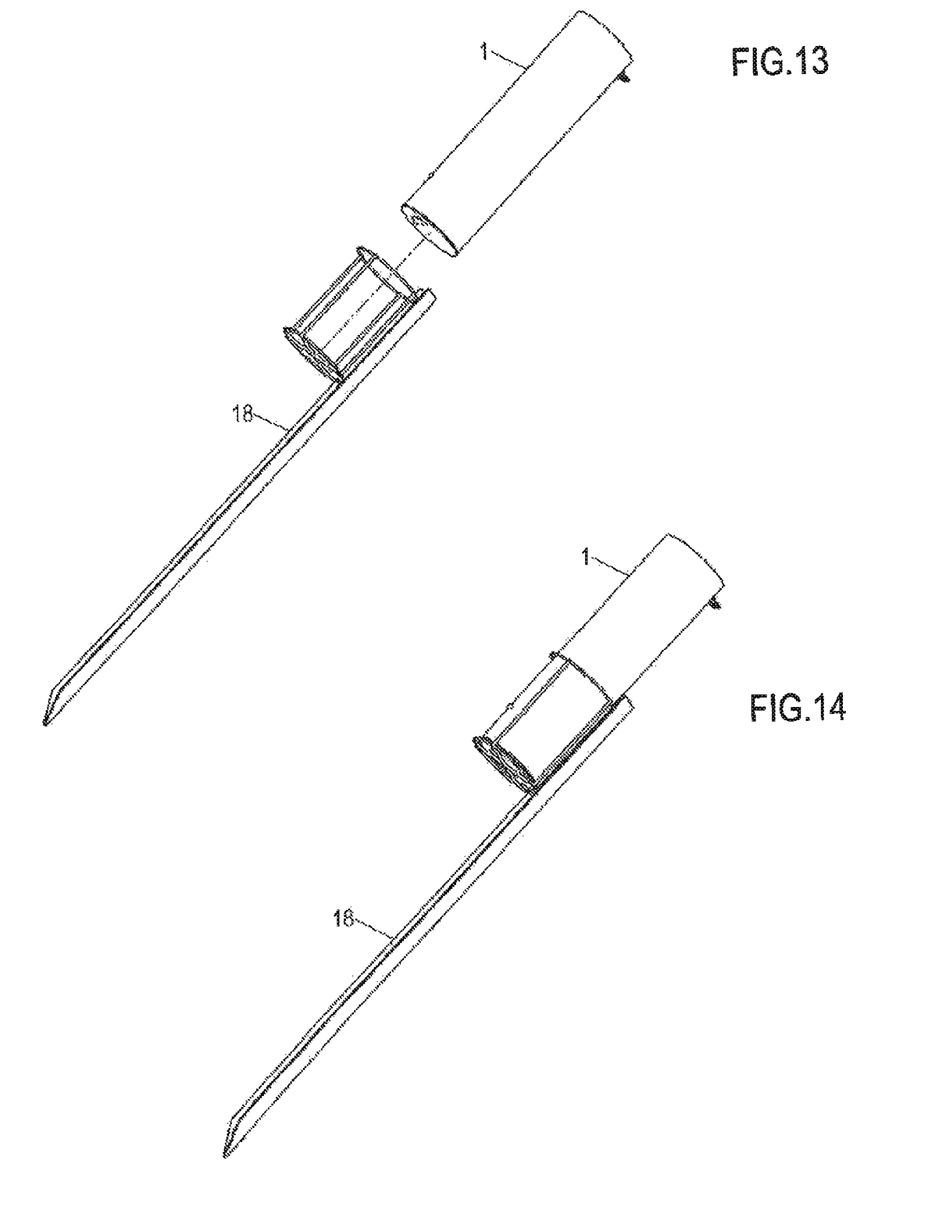
FIG. 13 is a disassembled view of the fishing aid.
FIG. 14 is an assembled view of the fishing aid.

FIG. 13 is the perspective view of the disassembled fishing aid. No. 1 is the outer sleeve and no. 18 is the sleeve holder.

FIG. 14 is the perspective view of the assembled fishing aid. No. 1 is the outer sleeve and no. 18 is the sleeve holder.

Figure 15:
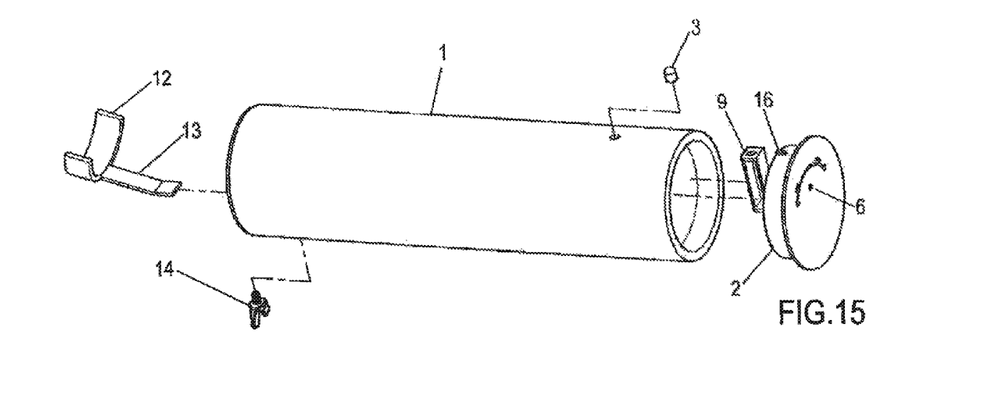
FIG. 15 is an exploded view of the outer sleeve.

FIG. 15 is the fishing aid outer sleeve exploded view. No. 1 is the outer sleeve, no. 2 is the bottom cover, no. 3 is the light, no. 6 is the audio port hole, no. 9 is the battery compartment, no. 12 is the pole stabilizer, no. 13 is the spring actuating bracket, no. 14 is the adjustable bite sensor, no. 16 is the guide.

Figure 16:
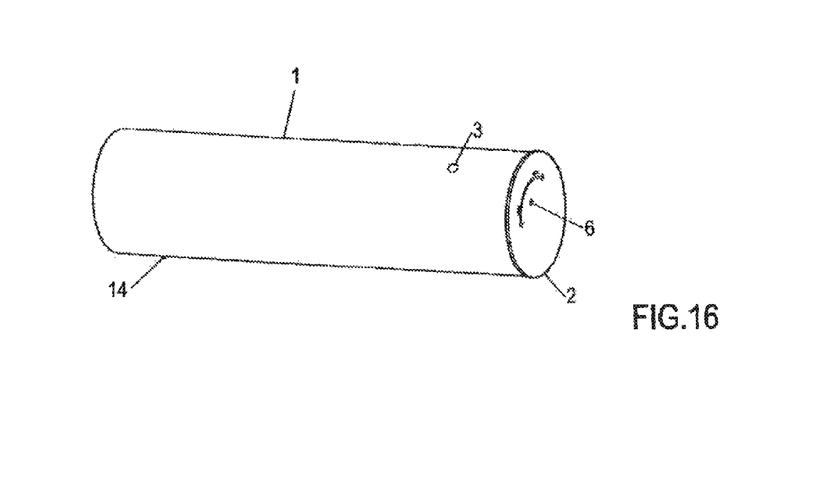
FIG. 16 is an assembled view of the outer sleeve.

FIG. 16 is the outer sleeve assembled view. No. 1 is the outer sleeve, no. 2 is the bottom cover, no. 3 is the light, no. 6 is the audio port hole, no. 14 is the adjustable bite sensor.

Figure 17:
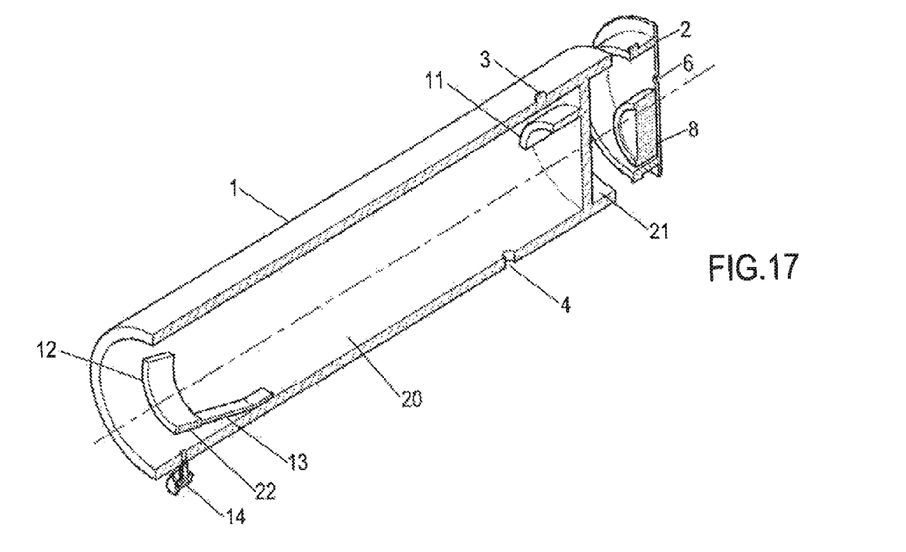
FIG. 17 is a sectional view of the outer sleeve.

FIG. 17 is the sectional view of the outer sleeve. No. 1 is the outer sleeve, no. 2 is the bottom cover, no. 3 is the light, no. 4 is the moisture drip hole, no. 6 is the audio port hole, no. 8 is the buzzer, no. 11 is the shaft holder, no. 14 is the adjustable bite sensor, no. 20 is the upper compartment, no. 21 is the lower compartment, no. 22 is the rod holder, which is made up of a pole stabilizer (no. 12) and a spring actuating bracket (no. 13).

Figure 18:
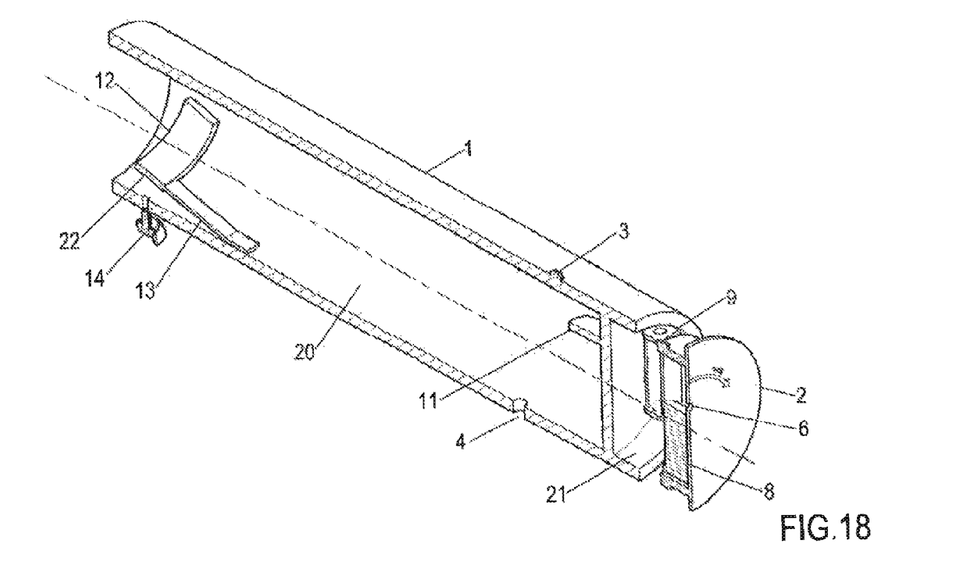
FIG. 18 is a sectional view of the outer sleeve.

FIG. 18 is the sectional view of the outer sleeve. No. 1 is the outer sleeve, no. 2 is the bottom cover, no. 3 is the light, no. 4 is the moisture drip hole, no. 6 is the audio port hole, no. 8 is the buzzer, no. 9 is the battery compartment, no. 11 is the shaft holder, no. 12 is the pole stabilizer, no. 13 is the spring actuating bracket, no. 14 is the adjustable bite sensor.

Operation

1. Remove the bottom cover 2 on the lower end of the outer sleeve 1. Insert a battery in the battery compartment 9. Place the bottom cover 2 back by twisting ¼ turn clockwise to lock the guide 16 of the bottom cover 2 securely.

2. Remove the spike 19 safety cap cover (not shown).

3. Carefully and safely drive the spike 19 of the sleeve holder 18 into the ground at an angle of approximately 60 degrees and deep enough to hold the weight of the outer sleeve 1 and the fishing pole (not shown).

4. Slide the outer sleeve 1 into the wire basket 17. Any rain or moisture drains from the outer sleeve 1 through the moisture drip hole 4 to prevent accumulation of water in the outer sleeve 1.

5. Adjust the sensitivity of the adjustable bite sensor 14 by adjusting the distance between the contacts which form a switch for the indicator circuit formed by the battery, the light 3 and/or buzzer 8, and the switch. In the figures, the adjustable bite sensor 14 takes the form of a contact mounted on a screw threaded through the outer sleeve 1 at the upper compartment 20 which will contain the fishing rod (not shown). The screw is turned clockwise for more sensitivity and counter clockwise for less sensitivity.

6. Cast your line to the intended target area and set the drag on your reel.

7. Slide the fishing pole in the outer sleeve 1 and place the fishing pole handle against the pole stabilizer 12 of the rod holder 22. The base of the fishing pole handle rests against the shaft holder 11.

8. When a bite or strike occurs the fishing rod bends which causes the pole stabilizer 12 to move down and deflect the spring actuating bracket 13. The pole stabilizer 12 triggers the adjustable bite sensor 14 by closing a switch in the indicator circuit. This sends a signal from a connecting wire (not shown) in the upper compartment 20 to the lower compartment 21 and triggers an indicator, such as a light 3 and/or a buzzer 8, to go off. The bottom cover 2 may include an audio port hole 6 to allow sound from the buzzer 8 to escape the lower compartment 21.

REFERENCE NUMERALS

1. Outer sleeve
2. Bottom cover
3. Light
4. Moisture drip hole
6. Audio port hole
8. Buzzer
9. Battery compartment
11. Shaft holder
12. Pole stabilizer
13. Spring actuating bracket
14. Adjustable bite sensor
16. Guide
17. Basket
18. Sleeve holder
19. Spike
20. Upper compartment
21. Lower compartment
22. Rod holder

I claim:

1. A fishing aid comprising:
    an outer sleeve formed from an elongate hollow tubular member having a top end and a bottom end, wherein said top end is open and said bottom end includes a recloseable bottom cover, said outer sleeve divided into an upper compartment accessible through said open top end and a lower compartment accessible through said bottom cover;
    a rod holder including a pole stabilizer and a spring actuating bracket, said rod holder located inside said upper compartment of said outer sleeve near said top end;
    an indicator circuit formed by an indicator disposed in said lower compartment, a removable battery, and a switch including two contacts, wherein one contact is mounted to an adjustable bite sensor threaded through said outer sleeve inside said upper compartment and one contact is disposed on said rod holder, wherein said contacts are aligned to close said indicator circuit and actuate said indicator when said spring actuating bracket is deflected to cause said contact on said rod holder to touch said contact on said outer sleeve, wherein the threading of said adjustable bite sensor changes the amount of deflection in said spring actuating bracket needed to cause said contacts to touch; and
    a sleeve holder formed from a basket, said basket having a circular open top end sized to receive said outer sleeve and a closed bottom end, and a spike attached to said basket, said circular open top end circumscribing said outer sleeve when said outer sleeve is inserted therein.

2. The fishing aid of claim 1 wherein said indicator is an electric buzzer.

3. The fishing aid of claim 1 wherein said indicator is a light.

4. The fishing aid of claim 1 wherein said indicator includes an electric buzzer and a light.

* * * * *